United States Patent
Chen et al.

(10) Patent No.: US 12,153,450 B2
(45) Date of Patent: Nov. 26, 2024

(54) METHOD AND SYSTEM FOR GENERATING VIRTUAL BOUNDARY OF WORKING AREA OF AUTONOMOUS MOBILE ROBOT, AND AUTONOMOUS MOBILE ROBOT AND READABLE STORAGE MEDIUM

(71) Applicant: Suzhou Cleva Precision Machinery & Technology Co., Ltd., Suzhou (CN)

(72) Inventors: Hong Chen, Suzhou (CN); Xiangyang Gao, Suzhou (CN); Shaoming Zhu, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 0 days.

(21) Appl. No.: 17/768,577

(22) PCT Filed: Sep. 17, 2020

(86) PCT No.: PCT/CN2020/115900
§ 371 (c)(1),
(2) Date: Apr. 13, 2022

(87) PCT Pub. No.: WO2021/212731
PCT Pub. Date: Oct. 28, 2021

(65) Prior Publication Data
US 2024/0103545 A1    Mar. 28, 2024

(30) Foreign Application Priority Data

Apr. 24, 2020  (CN) .......................... 202010329608.4

(51) Int. Cl.
G05D 1/648    (2024.01)
G05D 1/646    (2024.01)
G05D 111/30   (2024.01)

(52) U.S. Cl.
CPC .......... G05D 1/6484 (2024.01); G05D 1/646 (2024.01); *G05D 2111/36* (2024.01)

(58) Field of Classification Search
CPC .... G05D 1/00; G05D 2111/00; A47L 2201/00
See application file for complete search history.

(56) References Cited

U.S. PATENT DOCUMENTS 9,764,472 B1   9/2017  Ebrahimi Afrouzi et al.
10,520,950 B2  12/2019 Tang et al.
(Continued)

FOREIGN PATENT DOCUMENTS

CN  109085835  12/2018
CN  111185899   5/2020

OTHER PUBLICATIONS

International Search Report for Application No. PCT/CN2020/115900, dated Jan. 26, 2021.

*Primary Examiner* — Aniss Chad
*Assistant Examiner* — Elizabeth J Slowik
(74) *Attorney, Agent, or Firm* — JK Intellectual Property Law, PA

(57) ABSTRACT

A method, system, self-moving robot, and/or readable storage medium can be used to generate a virtual boundary of a working region for a self-moving robot. A mobile positioning module circles for a predetermined number of loops along a patrol path formed by the boundary of the working region to acquire recording points which are stored and then retrieved in groups to acquire boundary fitting points forming a boundary fitting point sequence, from which boundary points are acquired. Successively connecting the boundary points generates the virtual boundary of the working region.

10 Claims, 6 Drawing Sheets

(56) References Cited

U.S. PATENT DOCUMENTS

| | | |
|---|---|---|
| 11,442,448 B2 | 9/2022 | He et al. |
| 11,561,553 B1* | 1/2023 | Dydek .................. G05D 1/024 |
| 2009/0099730 A1* | 4/2009 | McClure ............. G05D 1/0278 |
| | | 701/41 |
| 2013/0166134 A1* | 6/2013 | Shitamoto ........... G05D 1/0088 |
| | | 701/26 |
| 2018/0099667 A1* | 4/2018 | Abe .................. B60W 30/0956 |
| 2018/0356832 A1 | 12/2018 | Reinert et al. |
| 2019/0196495 A1* | 6/2019 | Noh .......................... A47L 9/28 |
| 2019/0204839 A1* | 7/2019 | Sunil Kumar ..... G01C 21/3407 |
| 2019/0285422 A1* | 9/2019 | Opitsch .............. G01C 21/3852 |
| 2019/0339713 A1* | 11/2019 | Kwak ................ G06K 7/10306 |
| 2019/0369640 A1* | 12/2019 | He ........................ G01S 19/071 |
| 2020/0050213 A1* | 2/2020 | Lim ....................... G06V 20/70 |
| 2021/0018929 A1* | 1/2021 | Choi ...................... G05D 1/0274 |
| 2021/0041871 A1* | 2/2021 | Lai ....................... A47L 9/2852 |
| 2022/0257074 A1* | 8/2022 | Shim ................... G05D 1/2427 |
| 2022/0334587 A1* | 10/2022 | An ...................... G05D 1/0274 |

* cited by examiner

METHOD AND SYSTEM FOR GENERATING VIRTUAL BOUNDARY OF WORKING AREA OF AUTONOMOUS MOBILE ROBOT, AND AUTONOMOUS MOBILE ROBOT AND READABLE STORAGE MEDIUM

CROSS-REFERENCE TO RELATED PATENT APPLICATIONS

This application is a national stage of International Application No. PCT/CN2020/115900, filed on Sep. 17, 2020, which claims priority to CN patent application Ser. No. 20/2010329608.4, filed on Apr. 24, 2020. All of the aforementioned applications are hereby incorporated by reference in their entireties.

TECHNICAL FIELD

The disclosure relates generally to a method and system for generating a virtual boundary of a working region of a self-moving robot, and a self-moving robot and a readable storage medium, and more particularly to a method and a system for generating a virtual boundary of a working region of a self-moving robot, and a self-moving robot and a readable storage medium, which can improve working efficiency.

BACKGROUND

With the continuous progress of science and technology, various robots have stepped into people's life gradually, such as automatic vacuum robot, automatic mowing robot and so on. This kind of robot can walk and perform work automatically within a certain range without people's operation.

Full coverage path planning is a hot research direction of robot, which is very important to improve the working efficiency of robot. In the prior art, the commonly adopted technical solution is that the working path is manually assisted to be planned, and then the robot is driven to work according to the planned working path; specifically, a manual auxiliary input interface is arranged in cooperation with the robot, the current terrain is collected and output to the input interface in an automatic or auxiliary way, and the working path is drawn on the input interface according to the collected terrain in a manual auxiliary way; finally, the working path is converted into instructions to guide the robot to work.

In the above technical solution, it is usually necessary to increase auxiliary equipment such as cameras to acquire data, and necessary to increase the production and use cost of the equipment. In addition, it is also necessary to manually assist in designing the working path, which is cumbersome to use.

SUMMARY

The disclosure provides a method and system for generating a virtual boundary of a working region of a self-moving robot, and a self-moving robot and a readable storage medium, which can improve working efficiency.

The disclosure provides a method for generating a virtual boundary of a working region of a self-moving robot. The method comprises the following steps:

acquiring a plurality of recording points of the mobile positioning module which circles for a predetermined number of loops along a patrol path, wherein the patrol path is a loop formed by the boundary of the working region where the mobile robot is located; the predetermined number of loops being greater than or equal to 2;

storing the recording points corresponding to the first circle walked in the first storage linked list, and storing the remaining recording points in the second storage linked list;

successively retrieving each recording point in the first storage linked list as a basic coordinate point, and querying the second storage linked list to successively select m recording point groups corresponding to each basic coordinate point, each recording point group comprising a plurality of recording points closest to the currently selected basic coordinate point in the first storage linked list, and the number of recording points of the m recording point groups being successively increased; the m being an integer not less than 1;

acquiring boundary fitting points corresponding to the basic coordinate points according to each basic coordinate point and m corresponding recording point groups respectively, and forming a boundary fitting point sequence from a set of a plurality of boundary fitting points;

acquiring boundary points according to the boundary fitting point sequence;

successively connecting the boundary points to generate a virtual boundary of the working region.

Alternatively, the positioning module is a hand-held device, the hand-held device can be detachably equipped with a first UWB positioning module, and the self-moving robot is provided with a second UWB positioning module; wherein, in the application scene where the self-moving robot performs boundary learning, the first UWB positioning module is arranged in the hand-held device and circles along the patrol path, and the first UWB positioning module is a first UWB positioning tag; the second UWB positioning module is a second UWB positioning base station, and the second UWB positioning base station is located at a preset base station position;

in the application scene where the self-moving robot performs positioning and navigation, the first UWB positioning module is separated from the hand-held device and located at a preset base station position, the first UWB positioning module is a first UWB positioning base station, and the second UWB positioning module is a second UWB positioning tag and moves with the self-moving robot.

Alternatively, in the application scene where the self-moving robot performs boundary learning, the first UWB positioning tag detects a sampling confirmation signal, calculates a position coordinate of a recording point according to the sampling confirmation signal, and sends the position coordinate of the recording point to the self-moving robot, wherein, the sampling confirmation signal is a first key signal received when the hand-held device moves along the patrol path.

Alternatively, in the application scene where the self-moving robot performs boundary learning, the generating method further comprises the following steps before successively retrieving each recording point in the first storage linked list as a basic coordinate point:

the self-moving robot detects the sampling completion signal, and successively retrieves each recording point in the first storage linked list as a basic coordinate point according to the sampling completion signal, wherein, the sampling completion signal is a second key signal received by the hand-held device at the end of the patrol path.

Alternatively, the positioning module is a UWB positioning plug-in which is detachably installed on the self-moving robot. In the application scene where the self-moving robot performs boundary learning, the UWB positioning plug-in is used as a mobile positioning module to circle along the patrol path; the UWB positioning plug-in is arranged at the end of the self-moving robot in the application scene where the self-moving robot performs positioning and navigation.

Alternatively, the first UWB positioning tag calculates position coordinates of recording points at predetermined intervals or at predetermined distances, and sends the position coordinates of recording points to the self-moving robot.

Alternatively, the acquiring boundary points from the sequence of boundary fitting points further comprises the steps of:
  judging whether any boundary fitting point in the boundary fitting point sequence is collinear with the two adjacent boundary fitting points thereof, if so, taking the current boundary fitting point as the basis, and acquiring the corresponding boundary point by equidistant offset on the normal line passing through the current boundary fitting point; the boundary fitting point and the two adjacent boundary fitting points thereof are generated into a circle. If not, the corresponding boundary point is acquired by equidistant offset on the line connecting the current boundary fitting point with the center of the circle where the current boundary fitting point is located.

The disclosure also provides a system for generating the virtual boundary of the working region of the self-moving robot, which comprises:
  a recording and storing module used for acquiring a plurality of recording points that the mobile positioning module circles for a predetermined number of loops along the patrol path, the patrol path being a loop formed by the boundary of the working region where the mobile robot is located; the predetermined number of loops being greater than or equal to 2; and for storing the recording points corresponding to the first circle walked in the first storage linked list, and storing the remaining recording points in the second storage linked list;
  a retrieving module used for successively retrieving each recording point in the first storage linked list as a basic coordinate point, and querying the second storage linked list to successively select m recording point groups corresponding to each basic coordinate point, each recording point group comprising a plurality of recording points closest to the currently selected basic coordinate point in the first storage linked list, and the number of recording points of the m recording point groups being successively increased; the m being an integer greater than 1;
  a fitting module used for acquiring the boundary fitting point of the basic coordinate point according to each basic coordinate point and the corresponding m recording point groups thereof, and forming a boundary fitting point sequence from the collection of a plurality of the boundary fitting points;
  a processing module used for acquiring boundary points according to the boundary fitting point sequence and connecting the boundary points successively to generate virtual boundary of the working region.

The disclosure also provides a self-moving robot, comprising a memory and a processor, the memory storing a computer program, and when the processor executes the computer program, the steps of the generation method of the virtual boundary of the working region of the self-moving robot are implemented.

The disclosure also provides a readable storage medium storing a computer program thereon, and when the computer program is executed by a processor, the method of generating a virtual boundary of the working region of the self-moving robot is implemented.

Compared with the prior art, in the application scene where the self-moving robot performs boundary learning, the position coordinates of each recording point are acquired by circling for a predetermined number of loops along the patrol path by a mobile positioning module, and the virtual boundary of the self-moving robot is automatically generated by automatically correcting the position coordinates of the recording points acquired for many times; there is no need to input relevant parameters manually, which saves labor cost and improves work efficiency.

DETAILED DESCRIPTION

Figure 1:
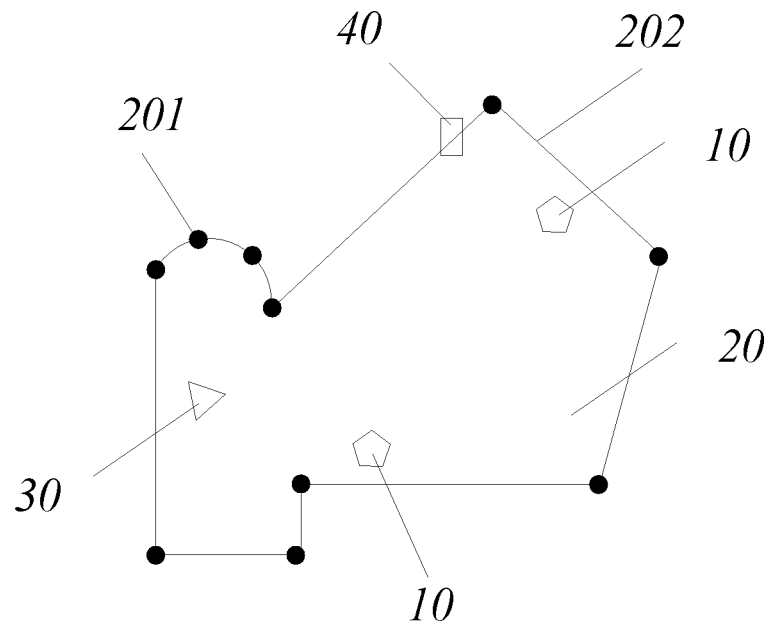
FIG. 1 is a first application scene of boundary learning by the self-moving robot of the present disclosure, wherein the hand-held device is manually controlled to acquire recording points, and the positions of the recording points comprise inflection points of straight boundaries and intermediate points of non-straight boundaries.

In order for those in the art to have a better understanding of the technical aspects of the present disclosure, a clear and complete description of the technical aspects of the embodiments of the present disclosure will be given below in conjunction with the accompanying drawings in the embodiments of the present disclosure, and it will be apparent that the described embodiments are only part of the embodiments of the present disclosure, not all of them. On the basis of the embodiments in the present disclosure, all other embodiments acquired by those of ordinary skill in the art without making creative efforts should fall within the scope of protection of the present disclosure.

Referring to FIGS. 1-10, the self-moving robot 30 of the present disclosure may be an automatic lawn mower, an automatic vacuum cleaner, etc., which automatically walks in the working region 20 to mow grass, vacuumize and the like. The self-moving robot 30 can acquire the recording point 201 of the working region 20 through the mobile positioning module and the positioning base station 10 and automatically generate the virtual boundary of the working region 20. At least three positioning base stations 10 with rechargeable batteries are arranged inside or at the edge of the working region, and the positioning base stations 10 can be UWB base stations or Zigbee base stations, etc. The mobile positioning module can complete the functions of recording and send coordinate positions independently of the self-moving robot 30, for example, it can be a dedicated hand-held device 40 or a UWB positioning plug-in 31 removably installed on the self-moving robot 30.

In one embodiment of the disclosure, the hand-held device 40 has a built-in first UWB positioning module, or a positioning base station 10 thereof is detachably installed on the hand-held device 40 to act as the first UWB positioning module of the hand-held device 40, and the first UWB positioning module is used for recording coordinate positions and sending coordinate positions to the self-moving robot 30. In the present disclosure, the self-moving robot 30 is provided with a second UWB positioning module. According to different application scenes, the use states of the first UWB positioning module and the second UWB positioning module are switched.

Referring to FIG. 1, in the application scene of boundary learning from the mobile robot 30, the positioning base station 10 serving as a first UWB positioning module is installed on the hand-held device 40 and circles along the patrol path 202, and the first UWB positioning module is a first UWB positioning tag; the second UWB positioning module is a second UWB positioning base station (i.e., the self-moving robot 30) located at a preset base station position (the base station corresponding to the preset base station position is used as the first UWB positioning module of the hand-held device 40).

Figure 2:
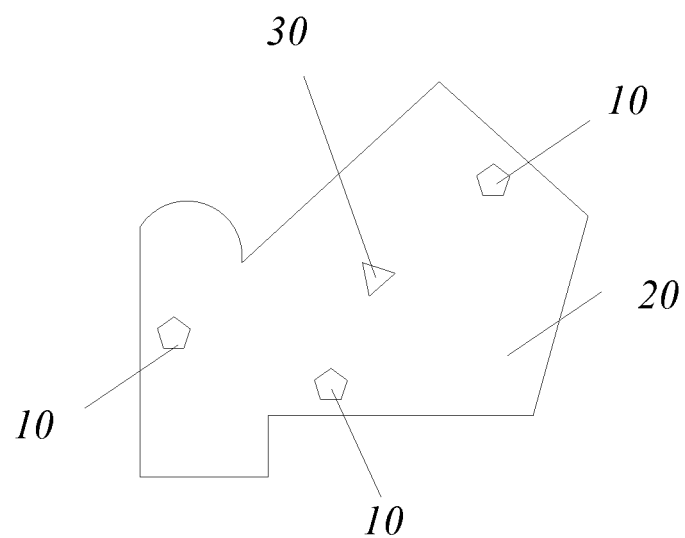
FIG. 2 is a first application scene of positioning and navigation according to the virtual boundary of the working region of the self-moving robot of the present disclosure.

Referring to FIG. 2, in the application scene of positioning and navigation by the mobile robot 30, the positioning base station 10 for acting as a first UWB positioning module is separated from the hand-held device and located at a preset base station position, the positioning base station 10 for acting as a first UWB positioning module is restored to a first UWB positioning base station, the second UWB positioning module is a second UWB positioning tag and moves with the self-moving robot 30.

The hand-held device 40 moves with the first UWB positioning tag as a positioning module, and the distance between the current position of the positioning tag and the positioning base station (the two positioning base stations 10 and the second UWB positioning module of the self-moving robot 30) can be calculated by manual control or timing control to determine the coordinate position of the positioning tag (i.e., the recording point 201).

The recording point 201 can be acquired in a variety of ways, such as manual control acquisition, acquisition according to a predetermined interval time, acquisition according to a predetermined distance, etc. It is only necessary to ensure that the recording point 201 is located on the patrol path 202 through which the robot travels.

Referring to FIG. 1, a hand-held device 40 is manually controlled to acquire a recording point 201, and the position of the recording point 201 comprises the inflection point of the straight-line boundary and the intermediate point position of the non-straight-line boundary. In another embodiment of the disclosure, in the application scene where the self-moving robot performs boundary learning, the first UWB positioning tag detects a sampling confirmation signal, and calculating the position coordinates of the recording point 201 according to the sampling confirmation signal, and sends the position coordinates of the recording point 201 to the self-moving robot, wherein, the sampling confirmation signal is a first key signal received when the hand-held device 40 moves along the patrol path 202, and the first key signal can be generated when the user holds the hand-held device 40 moving along the patrol path 202 at a preset position (the inflection point of the straight line boundary and the middle point of the non-straight line boundary) and presses the confirmation key (not shown) on the hand-held device 40 once. The user can also operate through the mobile phone APP to generate the first key signal.

Figure 3:
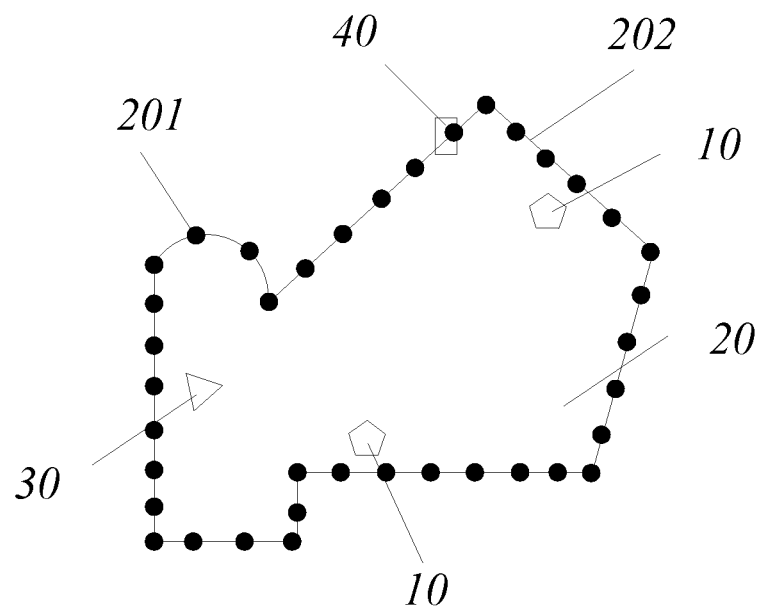
FIG. 3 is a second application scene of boundary learning by the self-moving robot of the present disclosure, in which the hand-held device is timed to acquire recording points.

Referring to FIG. 3, the hand-held device 40 can automatically acquire the position of the recording point 201 according to a predetermined interval time acquisition, according to a predetermined distance acquisition, etc. In another embodiment of the disclosure, the first UWB positioning tag calculates the position coordinates of the recording point 201 according to the predetermined interval time and sends the position coordinates of the recording point 201 to the self-moving robot 30. For example, the predetermined interval time is 50 ms at which time the recording point 201 is no longer limited to the inflection point.

Figure 4:
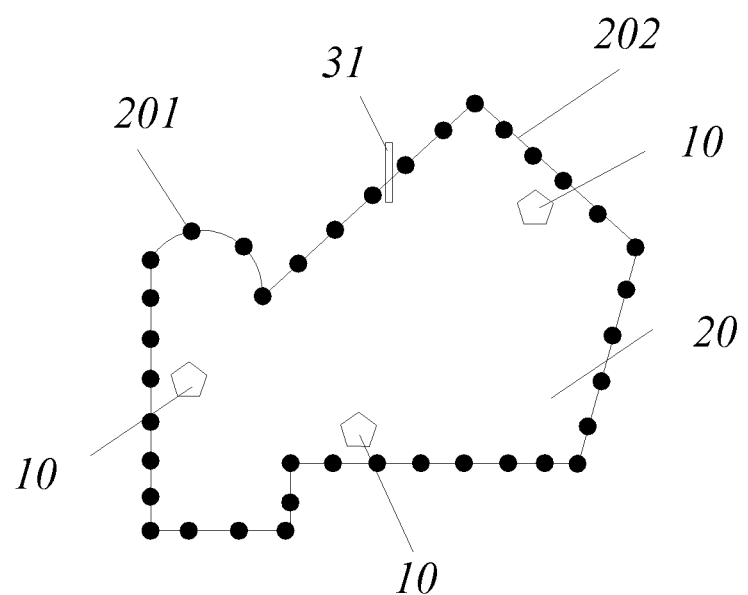
FIG. 4 is a third application scene of boundary learning by the self-moving robot of the present disclosure, wherein, timing control acquires recording points from UWB positioning plug-ins removed from the self-moving robot end.

Referring to FIG. 4, in another embodiment of the disclosure, the positioning module is a UWB positioning plug-in 31 which is detachably installed on the self-moving robot 30. In the application scene where the self-moving robot 30 performs boundary learning, the UWB positioning plug-in 31 is separated from the self-moving robot 30 and used for hand-held use; the UWB positioning plug-in 31 is inserted at the end of the self-moving robot in the application scene where the self-moving robot performs positioning and navigation.

Figure 5:
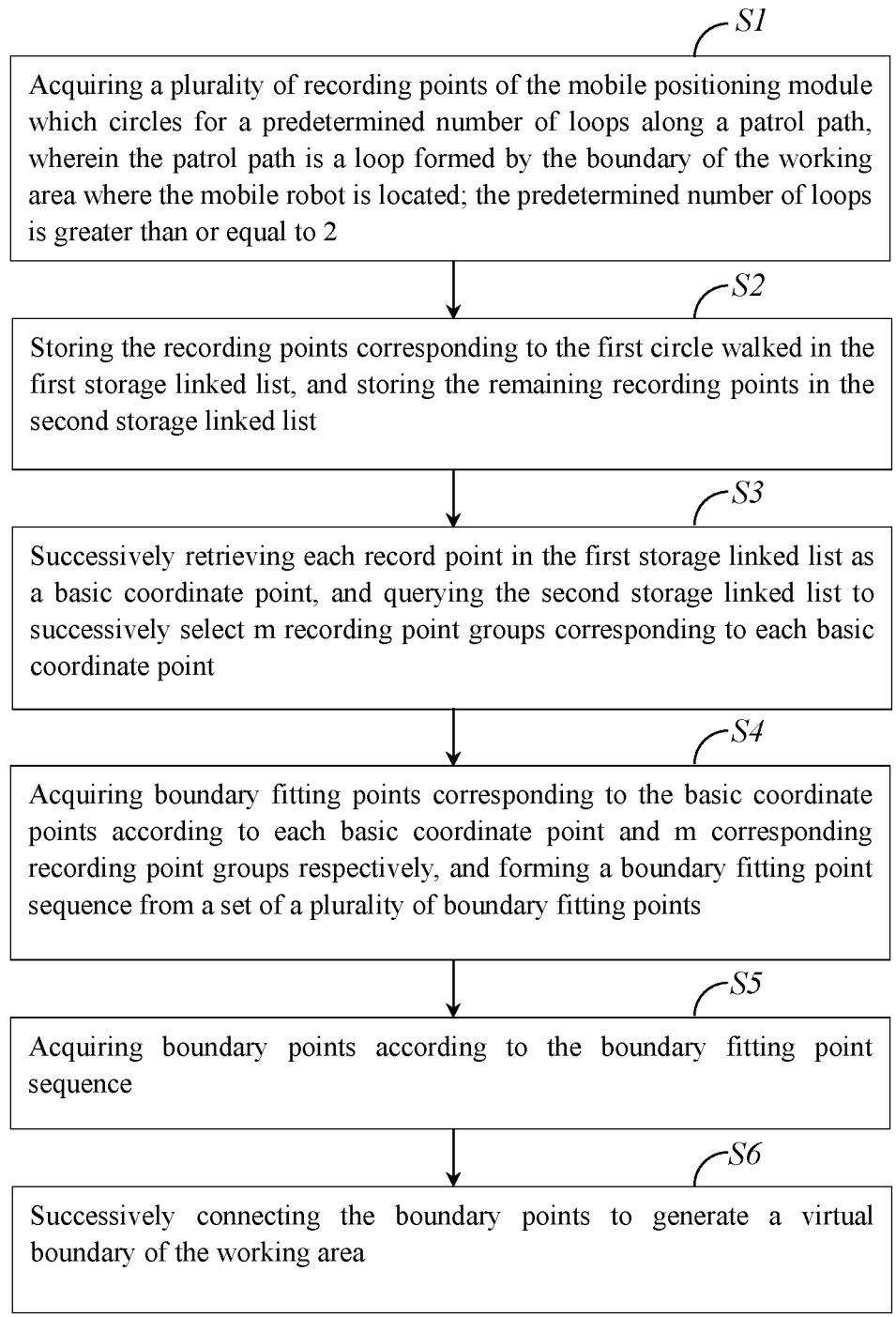
FIG. 5 is a flowchart of a first embodiment of a method for generating a virtual boundary of a work area of a self-moving robot according to the present disclosure.

Referring to FIG. 5, the hand-held device 40 or the self-moving robot 30 travels along the patrol path 202 and the position coordinates of the recording point 201 can be acquired by multiple circles walked along the path. The disclosure provides a method for generating a virtual boundary of a working region of a self-moving robot, which comprises the following steps:

S1, acquiring a plurality of recording points of the mobile positioning module which circles for a predetermined number of loops along a patrol path, wherein the patrol path is a loop formed by the boundary of the working region where the mobile robot is located; the predetermined number of loops being greater than or equal to 2;

S2, storing the recording points corresponding to the first circle walked in the first storage linked list, and storing the remaining recording points in the second storage linked list;

S3, successively retrieving each recording point in the first storage linked list as a basic coordinate point, and querying the second storage linked list to successively select m recording point groups corresponding to each basic coordinate point, each recording point group comprising a plurality of recording points closest to the currently selected basic coordinate point in the first storage linked list, and the number of recording points of the m recording point groups being successively increased; the m being an integer not less than 1;

S4, acquiring boundary fitting points corresponding to the basic coordinate points according to each basic coordinate point and m corresponding recording point groups respectively, and forming a boundary fitting point sequence from a set of a plurality of boundary fitting points;

S5, acquiring boundary points according to the boundary fitting point sequence;

S6, successively connecting the boundary points to generate a virtual boundary of the working region.

It should be noted that the virtual boundary can alternatively comprise an outer boundary and/or an inner boundary according to different working environments; the patrol path is usually designated by the user, or by means of fixed-point marking and peripheral magnetic field. The patrol path is a loop formed by the boundary of the working region. When the defined working region is within a certain boundary, the boundary is the outer boundary, that is, the outer boundary is the outermost boundary of the working region, which is unique; When the concurrently defined work area is outside a certain boundary, the boundary is an inner boundary, and the inner boundary and the outer boundary cooperate with each other to define the work area. The larger the predetermined number of loops, the more accurate the final result acquired. In the preferred embodiment of the disclosure, considering the complexity of calculation, the predetermined number of loops usually takes any value between 2 and 5.

It can be understood that, for the same work area, when the hand-held device 40 or the self-moving robot 30 travels along the patrol path for a predetermined number of loops, the patrol path shapes of each loop are basically the same but generally not exactly the same, and the number of recording points acquired per loop may be equal or different.

Figure 6:
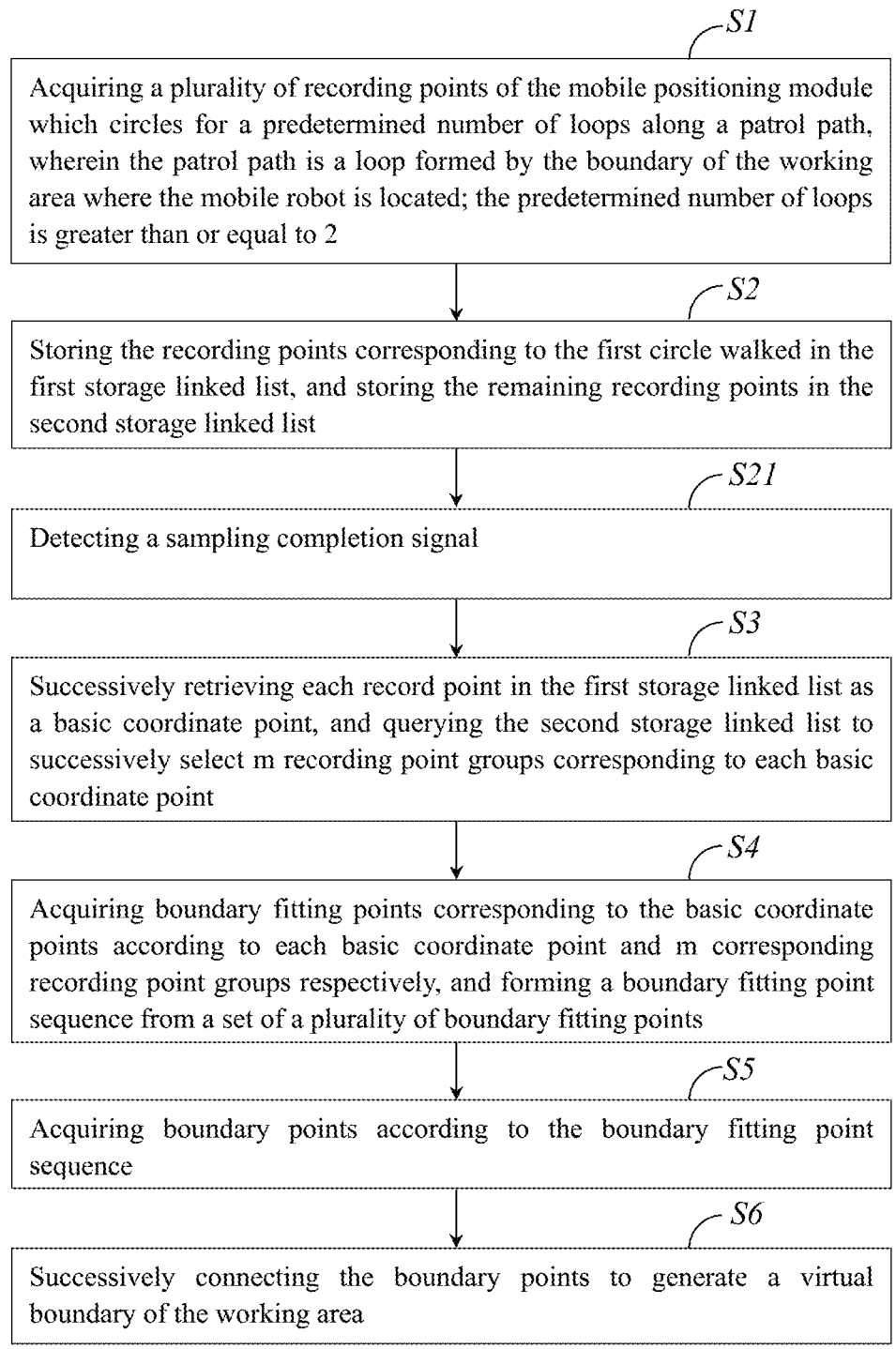
FIG. 6 is a flowchart of a second embodiment of a method for generating a virtual boundary of a work area of a self-moving robot according to the present disclosure.

Referring to FIG. 6, in another embodiment of the disclosure, the hand-held device 40 can generate a sampling completion signal and send it to the self-moving robot 30. In the application scene where the self-moving robot performs boundary learning, the generation method further comprises the following steps between steps S2 and S3:

S21, the self-moving robot detects a sampling completion signal and executes S3 according to the sampling completion signal, wherein, the sampling completion signal is a second key signal received by the hand-held device at the end of the patrol path. The second key signal can be generated by the user double-clicking the confirmation key on the hand-held device at the inflection point position of the patrol path.

In addition, the self-moving robot can also automatically judge whether the sampling is completed, and S2 and S3 also comprise the following steps: the self-moving robot judges whether the straight line distance between the first recording point and the last recording point is less than the first preset distance threshold, and if so, S3 is executed; if not, the execution S1 is returned.

The first preset distance threshold is a distance constant value, which can be specifically set according to the need, when the area of the working region is larger, the value can also be set larger, when the value is smaller, the value can also be set smaller; of course, regardless of the size of the working region, the results acquired are more accurate when the value is smaller. For example, in a specific example of the present disclosure, the first distance threshold can be set to 0.3 m.

Figure 7:
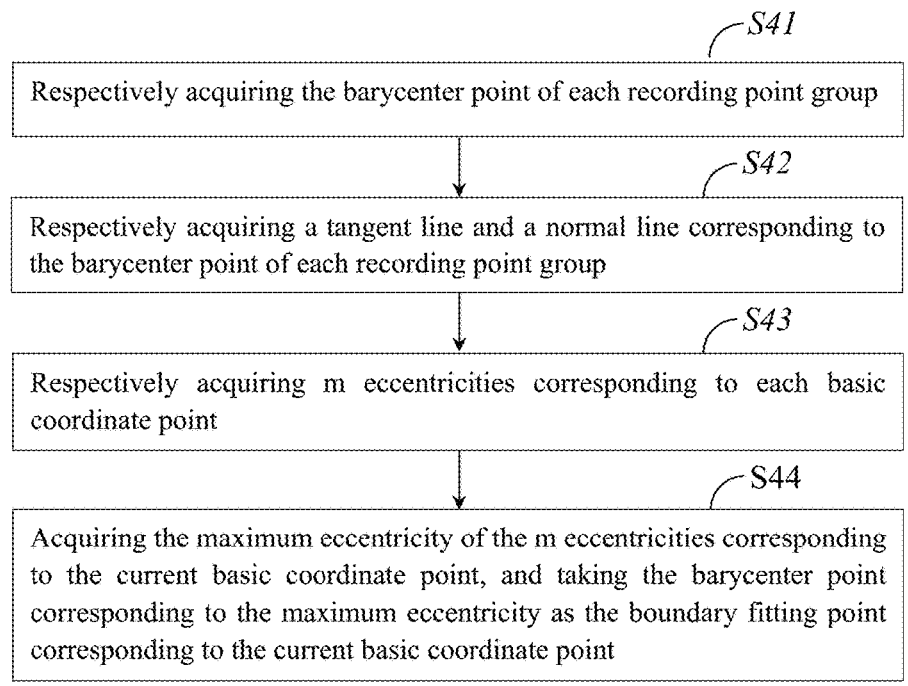
FIG. 7 is a detailed flowchart of S4 in FIG. 5.

Referring to FIG. 7, in another embodiment of the disclosure, S4 specifically comprises the following steps:

S41, respectively acquiring the barycenter points of each recording point group; the barycenter point here means the barycenter point of the particle system after each point in the recording point group is regarded as a particle, that is, the point where the sum of squares of distances to each point in the recording point group is the smallest;

S42, respectively acquiring a tangent line and a normal line corresponding to the barycenter point of each recording point group, wherein the tangent line is a straight line acquired by fitting all recording points comprised in the current recording point group through a least square method, and the normal line is a straight line passing through the barycenter point and perpendicular to the current tangent line;

S43, respectively acquiring m eccentricities corresponding to each basic coordinate point, wherein the eccentricities represent the deviation degree of the basic coordinate point and each barycenter point corresponding to the basic coordinate point;

The eccentricity is represented as:

$$Excen = 1 - \frac{a}{b},$$

a and b respectively represent the distance between the current basic coordinate point and the tangent line and the normal line;

S44, acquiring the maximum eccentricity of the m eccentricities corresponding to the current basic coordinate point, and taking the barycenter point corresponding to the maximum eccentricity as the boundary fitting point corresponding to the current basic coordinate point.

As a special case, when m=1, S4 only comprises: S41', respectively acquiring the barycenter point of each recording point group; S42', taking the barycenter point as the boundary fitting point corresponding to the current basic coordinate point.

For ease of understanding, a specific example is described for reference; assuming that the predetermined number of loops is 5 and each loop involves 10 recording points, the recording points stored in the first storage linked list, i.e., the basic coordinate points are 100, which are respectively P1, P2, ..., P100, and the recording points stored in the second storage linked list are 400; the value of m is 20, in order to ensure that the number of recording points comprised in each of the m recording point groups corresponding to each base coordinate point is successively increased, then the recording points which are comprised in the 20 recording point groups and which are closest to the presently selected base coordinate points in the first storage linked list are successively set as n, n+1, ..., n+(m−1), assuming that the value of n is 15, the recording points comprised in the first recording point group are represented as P21, P22, ..., P215 successively, the recording points comprised in the second recording point group are represented as P21, P22, ..., P215, P216 successively, and the recording points comprised in the m-th recording point group are represented as P21, P22, ..., P215, P216 successively.

From the above contents, it can be seen that P1 is taken as the basic coordinate point in the first storage linked list, and n recording points P21, P22, ..., P2N closest to P1 are taken in the second storage linked list to form a first recording point group, and n=15; the barycentric coordinates $P_{Emp1}(x_{Emp1}, y_{Emp1})$ of the first recording point group can be acquired through the barycenter point calculation formula, and a tangent line and a normal line passing through $P_{Emp1}$ can be further acquired, wherein the tangent line is a straight line acquired by fitting P21, P22, ..., P2N through a least square method, and the normal line is a straight line passing through the barycenter point and perpendicular to the current tangent line; furthermore, the eccentricity corresponding to P1 point is acquired by formula $$Excen = 1 - \frac{a}{b},$$

and a and b respectively represent the distance between the current basic coordinate point and the tangent line and the normal line; further, repeating the above steps, respectively acquiring m eccentricities corresponding to P1 for m recording point groups corresponding to P1; the maximum eccentricity of m eccentricity is acquired, and the barycenter corresponding to the maximum eccentricity is taken as the boundary fitting point corresponding to the current basic coordinate point; further, the boundary fitting points corresponding to each basic coordinate point are acquired according to m recording point groups corresponding to each basic coordinate point, and the set of the boundary fitting points is formed into a boundary fitting point sequence.

Figure 8:
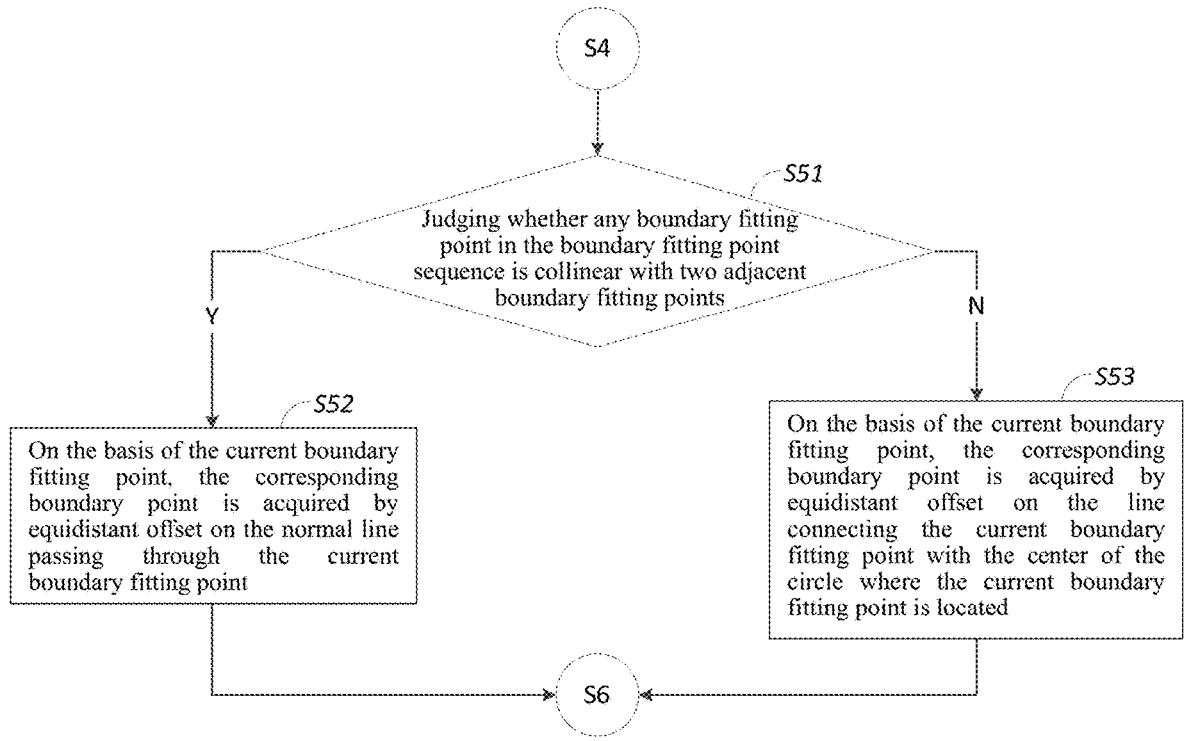
FIG. 8 is a detailed flowchart of S5 in FIG. 5.

Referring to FIG. 8, in another embodiment of the disclosure, S5 further comprises the following steps:
  S51, judging whether any boundary fitting point in the boundary fitting point sequence is collinear with two adjacent boundary fitting points, if so, S52 is executed; if not, S53 is executed;
  S52, on the basis of the current boundary fitting point, the corresponding boundary point is acquired by equidistant offset on the normal line passing through the current boundary fitting point; generating a circle from the boundary fitting point and two adjacent boundary fitting points;
  S53, on the basis of the current boundary fitting point, the corresponding boundary point is acquired by equidistant offset on the line connecting the current boundary fitting point with the center of the circle where the current boundary fitting point is located.

If the boundary comprises an outer boundary and an inner boundary, S5 specifically comprises the following steps: on the basis of the boundary fitting point corresponding to the outer boundary, the corresponding outer boundary point is acquired by outward equidistant offset; on the basis of the boundary fitting points corresponding to the inner boundary, the corresponding inner boundary points are acquired by inward equidistant offset.

The equidistant offset means that each boundary point has the same offset value of outward offset or inward offset. In the preferred embodiment of the present disclosure, when the robot is a robot mower, the offset value is usually not greater than the diameter of the cutter head on the robot.

It can be understood that in the specific embodiment of the present disclosure, if the boundary comprises an outer boundary and an inner boundary, the outer boundary and the inner boundary are respectively processed by the above method; that is to say, through the recording points acquired corresponding to the outer boundary, the outer boundary fitting points corresponding to the outer boundary are acquired, and the required outer boundary points are acquired according to the corresponding outer boundary fitting points; an outer boundary fitting point is acquired corresponding to the inner boundary through a recording point corresponding to the inner boundary, and a required inner boundary point is acquired according to the corresponding inner boundary fitting point; of course, the acquisition of outer boundary points and the acquisition of inner boundary points can be performed intersectionally, it's not described in detail here. Further, when the boundary comprises the outer boundary and the inner boundary, the outer boundary is usually processed first, and then the inner boundary is processed to avoid duplication of work, it's not described in detail here.

Figure 9:
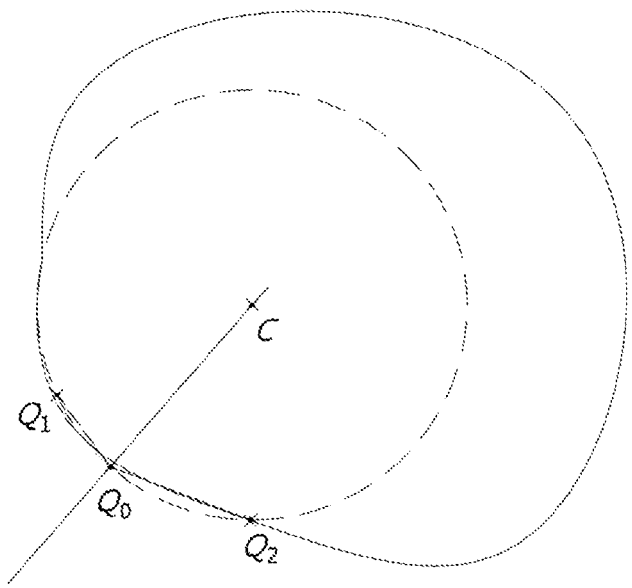
FIG. 9 is an application effect diagram of a specific example of FIG. 8.

For ease of understanding, a specific example is described for reference, as shown in FIG. 9, three adjacent outer boundary fitting points corresponding to the outer boundary are Q0, Q1 and Q2, wherein, Q1 and Q2 are placed on both sides of Q0, and the three outer boundary fitting points are not collinear, so that Q0, Q1 and Q2 are three coordinates on the same circle to form a circle, and the center of the circle is C, then the connecting direction between Q0 and the center of the circle is the offset direction. Further, in this embodiment, because the three boundary fitting points correspond to the outer boundary, the connecting direction between Q0 and the center of the circle is offset outward to form an outer boundary point.

In another embodiment of the disclosure, after S6, the self-moving robot further optimizes the virtual boundary, which comprises replacing the points adopted on the circular arc or circle with fitting circular arc or circle, and acquiring the optimized virtual boundary.

Figure 10:
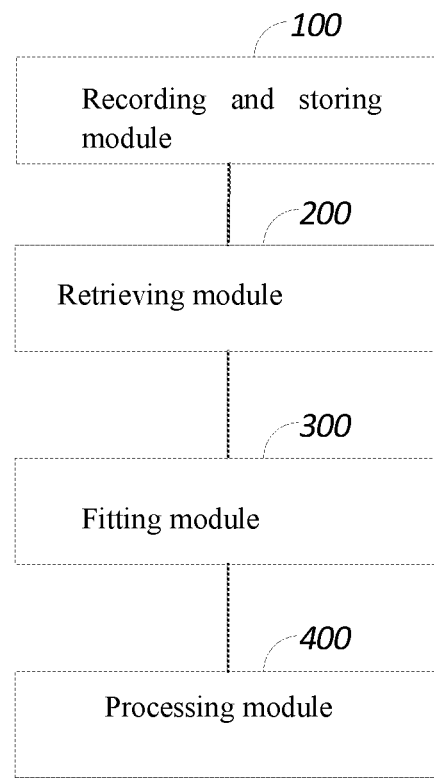
FIG. 10 is a schematic block diagram of a system for generating virtual boundaries of a working region of a self-moving robot of the present disclosure.

Referring to FIG. 10, the disclosure also provides a system for generating a virtual boundary of a working region of a self-moving robot, which comprises:
  a recording and storing module 100 used for acquiring a plurality of recording points that the mobile positioning module circles for a predetermined number of loops along the patrol path, the patrol path being a loop formed by the boundary of the working region where the mobile robot is located; the predetermined number of loops being greater than or equal to 2; and for storing the recording points corresponding to the first circle walked in the first storage linked list, and storing the remaining recording points in the second storage linked list;
  a retrieving module 200 used for successively retrieving each recording point in the first storage linked list as a basic coordinate point, and querying the second storage linked list to successively select m recording point groups corresponding to each basic coordinate point, each recording point group comprising a plurality of recording points closest to the currently selected basic coordinate point in the first storage linked list, and the number of recording points of the m recording point groups being successively increased; the m being an integer greater than 1;
  a fitting module 300 used for acquiring the boundary fitting point of the basic coordinate point according to each basic coordinate point and the corresponding m recording point groups thereof, and forming a boundary fitting point sequence from the collection of a plurality of the boundary fitting points;
  a processing module 400 used for acquiring boundary points according to the boundary fitting point sequence and connecting the boundary points successively to generate virtual boundary of the working region.

The disclosure also provides a self-moving robot, which comprises a memory and a processor, the memory storing a computer program, and when the computer program is executed by the processor, the steps of a method for generating a virtual boundary of the working region of the self-moving robot are implemented.

The disclosure also provides a readable storage medium storing a computer program thereon, and when the computer program is executed by a processor, the method of generating a virtual boundary of the working region of the self-moving robot is implemented.

In summary, in the application scene of boundary learning by the self-moving robot, the position coordinates of each recording point are acquired by the mobile positioning module circling for a predetermined number of loops along the patrol path, and the virtual boundary of the self-moving robot is automatically generated by automatically correcting the position coordinates of the recording points acquired for many times; there is no need to input relevant parameters manually, which saves labor cost and improves work efficiency.

In addition, it should be understood that, while this description is described in accordance with embodiments, however, each embodiment does not contain only an independent technical solution, and the description is described for clarity only. Those skilled in the art should take the description as a whole, and the technical solutions in each embodiment may be suitably combined to form other embodiments that can be understood by those skilled in the art.

The series of detailed descriptions set forth above are intended to be specific to feasible embodiments of the present disclosure only and are not intended to limit the scope of protection of the present disclosure, and any equivalent embodiments or modifications made without departing from the technical spirit of the present disclosure should be comprised within the scope of protection of the present disclosure.

The invention claimed is:

1. A method for generating a virtual boundary of a working region of a self-moving robot, the method comprising the following steps:
   acquiring a plurality of recording points using a mobile positioning module which circles for a predetermined number of loops along a patrol path, wherein the patrol path is a loop formed by the boundary of the working region where the self-moving robot is located, the predetermined number of loops being greater than or equal to 2;
   storing the recording points corresponding to a first of the loops walked in a first storage linked list, and storing the recording points corresponding to any of the loops after the first of the loops in a second storage linked list;
   successively retrieving each recording point in the first storage linked list as a basic coordinate point, and querying the second storage linked list to successively select m recording point groups corresponding to each basic coordinate point, each recording point group comprising a plurality of recording points closest to a given one of the basic coordinate points in the first storage linked list, and wherein a number of recording points of the m recording point groups is successively increased as m becomes larger, with m being an integer not less than 1;
   acquiring boundary fitting points corresponding to the basic coordinate points according to each basic coordinate point and m corresponding recording point groups respectively, and forming a boundary fitting point sequence from a set of a plurality of boundary fitting points;
   acquiring boundary points according to the boundary fitting point sequence; and
   successively connecting the boundary points to generate a virtual boundary of the working region; and
   wherein the step of forming the boundary fitting point sequence includes:
   respectively acquiring a barycenter point for each recording point group;
   respectively acquiring a tangent line and a normal line corresponding to the barycenter point of each recording point group, wherein an eccentricity of each recording point group represents an amount of deviation of a respective basic coordinate point and a respective barycenter point corresponding to the respective basic coordinate point;
   wherein the eccentricity is equal to 1-a/b;
   wherein a represents a distance between the respective basic coordinate point and the respective tangent line, and b represents a distance between the respective basic coordinate point and the respective normal line;
   respectively acquiring m eccentricities corresponding to each basic coordinate point;
   acquiring a maximum eccentricity of the m eccentricities corresponding to the respective basic coordinate point, and taking a barycenter point corresponding to the maximum eccentricity as the boundary fitting point corresponding to the respective basic coordinate point.

2. The method for generating the virtual boundary of the working region of the self-moving robot according to claim 1, wherein the mobile positioning module is a hand-held device, the hand-held device is detachably equipped with a first UWB positioning module, and the self-moving robot is provided with a second UWB positioning module; wherein,
   when the self-moving robot performs boundary learning, the first UWB positioning module is arranged in the hand-held device and circles along the patrol path, and the first UWB positioning module is a first UWB positioning tag, the second UWB positioning module is a second UWB positioning base station, and the second UWB positioning base station is located at a preset base station position; and
   when the self-moving robot performs positioning and navigation, the first UWB positioning module is separated from the hand-held device and located at a preset base station position, the first UWB positioning module is a first UWB positioning base station, and the second UWB positioning module is a second UWB positioning tag and moves with the self-moving robot.

3. The method for generating a virtual boundary of a working region of a self-moving robot according to claim 2, wherein, when the self-moving robot performs boundary learning, the first UWB positioning tag detects a sampling confirmation signal, calculates a position coordinate of a recording point according to the sampling confirmation signal, and sends the position coordinate of the recording point to the self-moving robot, wherein, the sampling confirmation signal is a first key signal received when the hand-held device moves along the patrol path.

4. The method for generating the virtual boundary of the working region of the self-moving robot according to claim 2, wherein, when the self-moving robot performs boundary learning, the method further comprising the following steps before the step of successively retrieving each recording point in the first storage linked list as a basic coordinate point:
   using the self-moving robot detecting a sampling completion signal, and successively retrieving each recording point in the first storage linked list as a basic coordinate point according to the sampling completion signal, wherein, the sampling completion signal is a second key signal received by the hand-held device at the end of the patrol path.

5. The method for generating a virtual boundary of a working region of a self-moving robot according to claim 1, wherein the mobile positioning module is a UWB positioning plug-in which is detachably installed on the self-moving robot, and when the self-moving robot performs boundary learning, the UWB positioning plug-in is used as a mobile positioning module to circle along the patrol path, the UWB positioning plug-in is arranged at an end of the self-moving robot when the self-moving robot performs positioning and navigation.

6. The method for generating a virtual boundary of a working region of a self-moving robot according to claim 1, wherein a first UWB positioning tag calculates position coordinates of recording points at predetermined intervals or at predetermined distances and sends the position coordinates of the recording points to the self-moving robot.

7. The method for generating a virtual boundary of a working region of a self-moving robot according to claim 1, wherein the step of acquiring boundary points according to the boundary fitting point sequence further comprises the following steps:

judging whether any boundary fitting point in the boundary fitting point sequence is collinear with two adjacent boundary fitting points thereof, if so, taking a current boundary fitting point as a basis, and acquiring a corresponding boundary point by equidistant offset on a normal line passing through the current boundary fitting point; generating a circle using the current boundary fitting point and the two adjacent boundary fitting points thereof; and, if not, acquiring the corresponding boundary point using equidistant offset on a line connecting the current boundary fitting point with a center of a circle where the current boundary fitting point is located.

8. A system for generating a virtual boundary of a working region of a self-moving robot, the system comprising a self-moving robot, a mobile positioning device, and a base station that together perform the steps of the method of generating a virtual boundary of a work area of the self-moving robot according to claim 1.

9. A self-moving robot comprising a memory and a processor, the memory storing a computer program, wherein, when the processor executes the computer program, the steps of the method of generating a virtual boundary of a work area of the self-moving robot according to claim 1 are implemented.

10. A non-transitory computer readable storage medium having a computer program stored thereon, wherein, when the computer program is executed by a processor, the steps of the method of generating a virtual boundary of a work area of a self-moving robot according to claim 1 are implemented.

* * * * *